United States Patent [19]

Meyer

[11] Patent Number: 5,383,723
[45] Date of Patent: Jan. 24, 1995

[54] EARTHQUAKE RESISTANT ELECTRONIC EQUIPMENT FRAME

[75] Inventor: John A. Meyer, Fairport, N.Y.

[73] Assignee: Northern Telecom Limited, Montreal, Canada

[21] Appl. No.: 48,672

[22] Filed: Apr. 19, 1993

[51] Int. Cl.⁶ .............. A47B 47/00; E02D 27/34; E04H 9/02; E04H 12/00
[52] U.S. Cl. .............. 312/265.4; 52/655.1; 52/167.1; 52/167.3
[58] Field of Search .............. 312/265.1–265.4; 52/280, 281, 167 R, 167 CB, 653.2, 690, 655.1, 587

[56] References Cited

U.S. PATENT DOCUMENTS

| | | | |
|---|---|---|---|
| 3,829,999 | 8/1974 | Bernstein | 52/653.2 X |
| 4,125,973 | 11/1978 | Lendrihas | 52/653.2 X |
| 4,267,682 | 5/1981 | Fowler et al. | 52/280 X |
| 4,562,681 | 1/1986 | Smith | 52/655.1 |
| 4,758,111 | 7/1988 | Yitta | 52/280 X |
| 4,885,883 | 12/1989 | Wright | 52/280 |
| 5,228,259 | 7/1993 | Haddad et al. | 52/653.2 |
| 5,257,440 | 11/1993 | Bardoo et al. | 52/280 X |

Primary Examiner—Stephen C. Pellegrino
Assistant Examiner—Nancy Mulcare
Attorney, Agent, or Firm—Foley & Lardner

[57] ABSTRACT

Earthquake resistant electronic equipment support frame having vertical frame members and a base. The base is of more massive structure close to the vertical frame members and the more massive structure is rigidly secured to the vertical frame members and has apertures for receiving securing elements to mount the frame upon a support. The frame may be mounted upon a pedestal and protect equipment on an above-ground floor.

6 Claims, 4 Drawing Sheets

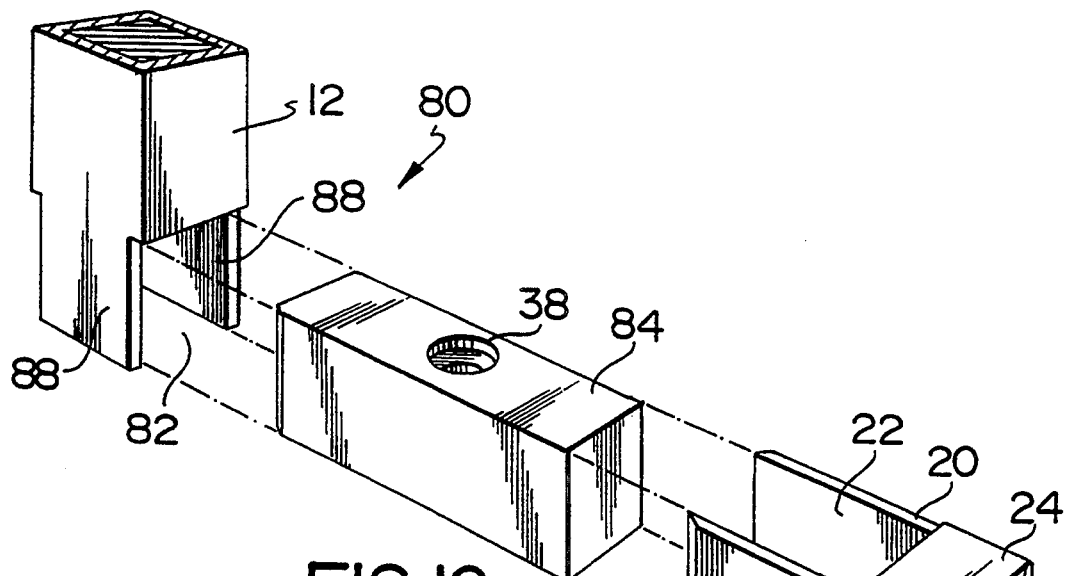
FIG.10
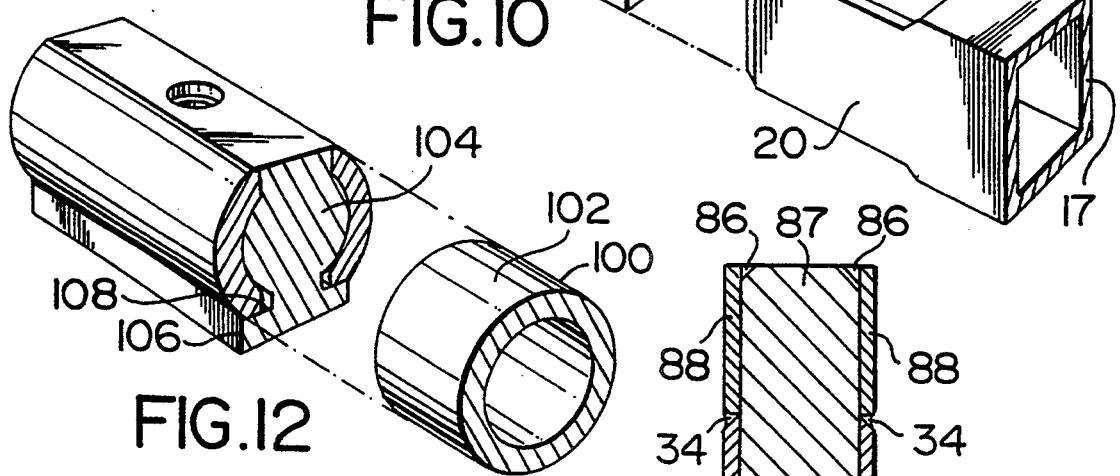
FIG.12
FIG.11
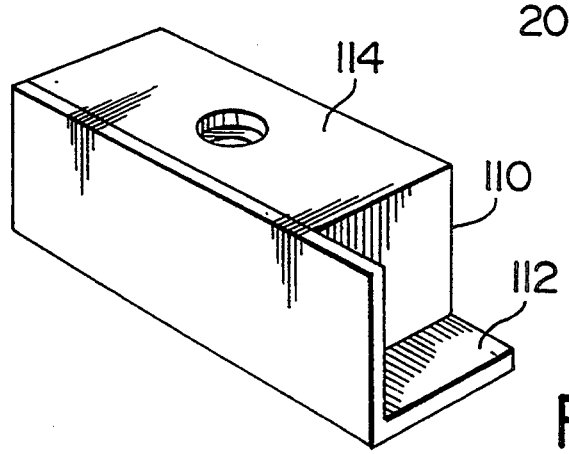
FIG.13

EARTHQUAKE RESISTANT ELECTRONIC EQUIPMENT FRAME

This invention relates to earthquake resistant electronic equipment frames.

It is desirable to protect electronic equipment from damage during earthquake or seismic shock activity. In particular, it is an essential requirement that after an earthquake or seismic shock, telecommunications equipment located in the earthquake vicinity is operational. With this object in mind, telecommunications equipment has been mounted in specially designed frames which are intended to support the equipment in such a manner that it is able to withstand the most severe earthquakes and seismic shocks which are likely to occur in that vicinity. It is known that an earthquake resistant frame should have as high a natural vibrational frequency as possible and to make such frames rigid for this purpose, they are normally made of massive section structures with large section bracing and stiffening members. A problem inherent in such technological thought is that a frame is extremely heavy and is expensive to manufacture. A further problem which is found is that the conventional frames have methods of securing them to underlying supporting structures such that the frames are incapable of satisfactorily protecting the equipment from severe damage caused by earthquake activity for all supporting methods which may be employed. For instance, one conventional frame when mounted securely upon a concrete floor, has a natural vibrational frequency of approximately 6.5 Hz when subjected to an earthquake measured with an intensity of about 8.3 on the Richter scale. This frequency is acceptable to prevent damage to telecommunications equipment held by the frame. However, for various reasons it is sometimes normal for telecommunications equipment to be housed upon upper stories of buildings, e.g. the second or third storey. The horizontal acceleration levels in movements of floors during seismic activity increase from floor-to-floor upwardly from the ground. It follows that when conventional frames are mounted upon an above ground floor there is the problem that the acceleration levels of movement of the floor effectively acts upon the frame so that it is less likely to protect telecommunications equipment from strong earthquakes or seismic activity.

Further, in a room housing telecommunications equipment, it is normal practice to provide a false floor above the structural floor of the building to form a space beneath the false floor to accommodate electrical wiring and air circulatory equipment used with the telecommunications equipment. Such false floors are designed to have only sufficient strength to support the weight of operators and maintenance personnel. However, the horizontal natural frequencies of these false floors are too low to make them suitable to carry the weight of the telecommunications equipment and its supporting frames. As a consequence, the telecommunications equipment and supporting frames need to be carried by the structural floor and to enable this to be done the telecommunications equipment and frame extend upwardly from the structural floor through an aperture in the false floor. The aperture is necessarily spaced laterally from the telecommunications equipment and frame to enable personnel to move close to the lower end of the equipment which necessarily is disposed downwardly of the support surface of the false floor and for this purpose steps must be provided down through the aperture to the structural floor. This results in a complex structure which would be unnecessary if the frame could be raised to at least the level of the false floor whereby the lower parts of the equipment would be accessible to personnel standing upon the false floor. However, to permit this to occur the frame must be supported upon a pedestal from the structural floor. The pedestal itself has its own natural frequency which in combination with the conventional frame mounted above it, produces a lower natural frequency for this combination than for the frame itself. Unfortunately, this natural frequency is so low that equipment carried thereby would not be satisfactorily protected against strong earthquakes.

The present invention seeks to provide an earthquake resistant electronic equipment frame which in use will minimize the above problems.

According to the invention there is provided an earthquake resistant electronic equipment support frame comprising a plurality of upwardly extending frame members and frame base means extending between the upwardly extending frame members to hold the upwardly extending frame members in fixed relative positions, the base means having regions extending directly from the upwardly extending frame members, said regions being of more massive construction than other parts of the base means which are more remote from the upwardly extending frame members, the more massive regions being rigidly secured to the upwardly extending members and formed with apertures for receiving screw-threaded members to mount the frame upon a support.

When the frame of the invention is secured to an underlying support then the stiffness of the frame is partly dependent upon the massive construction of the more massive regions at the base means, the rigidity of the structure between the massive regions and the upwardly extending frame members and also upon the location of the apertures relative to the upwardly extending frame members. These apertures should be disposed as close as is practical to the upwardly extending frame members, the close positioning dependent upon the type of screw-threaded securing members which are located through the apertures to mount the frame upon the support and their accessibility needs. In an ideal situation it is envisaged that the position of the apertures should be no greater than 1.50 inches away from the upwardly extending frame members. Hence, with a structure of support frame according to the invention, the positions of the apertures affect the stiffness of the frame upon the support and this stiffness increases with the decreasing distance of the apertures from the upwardly extending frame members. The massive regions of the base means ensure that no or insignificant bending takes place in the structure between the apertures and the upwardly extending frame members so that the stiffness is maximized in these regions. In frame structures according to the invention when using frame members and base means made from steel tubing or box frame structures, a frame weight of approximately 128 lbs is achievable to provide a natural vibrational frequency of 13 to 14 Hz with the frame securely mounted upon a concrete floor while being subjected to an earthquake intensity of 8.3 upon the Richter scale. This vibrational frequency is suitable for protecting equipment when mounted upon an upper storey, i.e. upon a structural floor, and in addition, when mounted upon pedestals to dispose them with the lower parts of telecommunications equipment accessible directly from a false floor. More particularly, in one preferred construction of box frame structure and employed in conjunction with a false floor carried above a supporting upper storey floor, and when using an adjustable height pedestal having a natural vibrational frequency of 70 to 80 Hz, and mounted upon the structural floor, an acceptable natural vibrational frequency of at least 6.5 Hz for the combination of frame and pedestal is obtainable for an earthquake with an intensity of 8.3 upon the Richter scale.

In a preferred arrangement, the upwardly extending frame members on the base means are formed from steel, particularly carbon steel tubing which is preferably of box-type construction in cross-section, but may instead be circular in cross-section. With such an arrangement, the more massive regions of the base means are preferably secured to the upwardly extending frame members by a welding operation to provide the necessary rigidity. In addition, it is preferable to have the more massive regions rigidly secured to the remainder of the base means by welding. It is also contemplated, that the frame may be formed from other materials such as box-type or circular cross-section tubing formed from fiber reinforced resins or plastics having a sufficiently high Young's modulus to provide the rigidity required in the frame. With such an arrangement using fiber reinforced plastics, resin-type adhesives may need to be used to rigidly secure the more massive regions of the base means to the upwardly extending frame members.

Preferably, the upwardly extending frame members are at their lower ends disposed at corners of a polygon and some at least of the massive regions of the base means lie along sides of the polygon. With this preferred arrangement, the apertures in these more massive base regions may be disposed outwardly from electronic equipment to be mounted within the frame so as to be accessible for mounting and disconnecting the frame from a support. With such an arrangement, it renders it possible to assemble the frame and locate the equipment within it before the frame is moved to its operational position for securement purposes. This procedure may be more convenient than first requiring the frame to be located in its operational position followed by assembly of the equipment into the frame.

Further, in a preferred arrangement, the base means comprises a plurality of base frame members. Each base frame member comprises an elongate intermediate element extending along a side of the polygon. More massive regions are disposed at opposite end regions of each base frame member and comprise end members secured to the intermediate element. Preferably the intermediate elements extend from end-to-end of the base frame members so as to lie side-by-side with the end members along the end regions. With such an arrangement it is preferable for each intermediate element to be of box-type cross-section and the end members should be of a block structure to be disposed within channels at the end regions of the base frame members. It is also advantageous to form each intermediate element as a rectangular box section having upper and lower opposite walls substantially horizontal and with a slot formed in the intermediate element along each end region of the base frame member to receive an end member within the slot so as to lie between the other pair of walls of the intermediate element.

Embodiments of the invention will now be described, by way of example, with reference to the accompanying drawings, in which.

Figure 2:
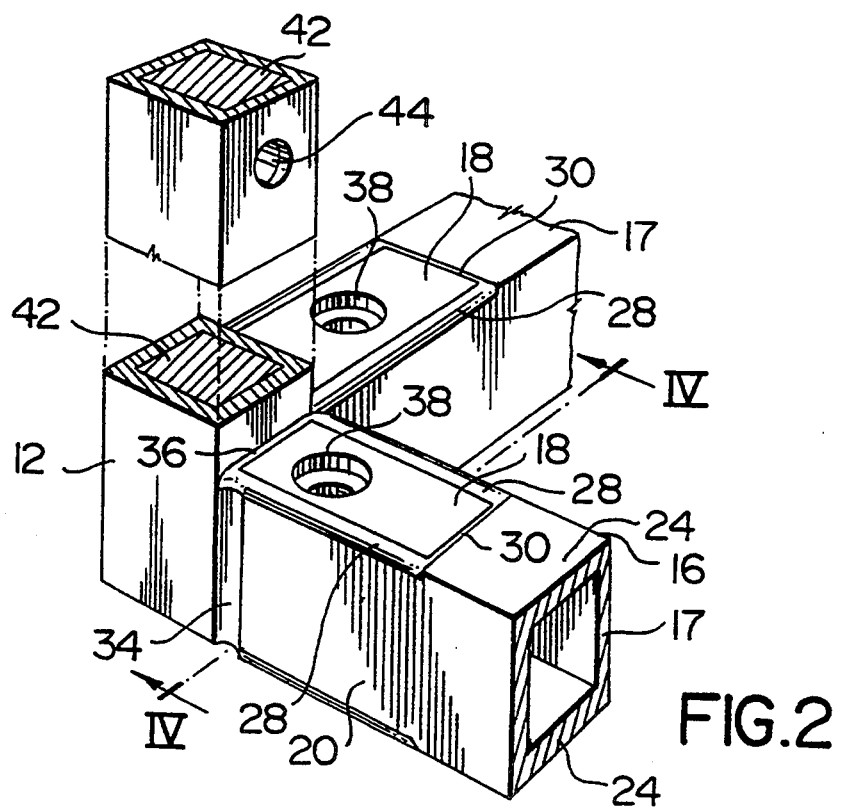
FIG. 2 is an isometric view on enlarged scale of a lower corner of the support frame of FIG. 1.
Figure 3:
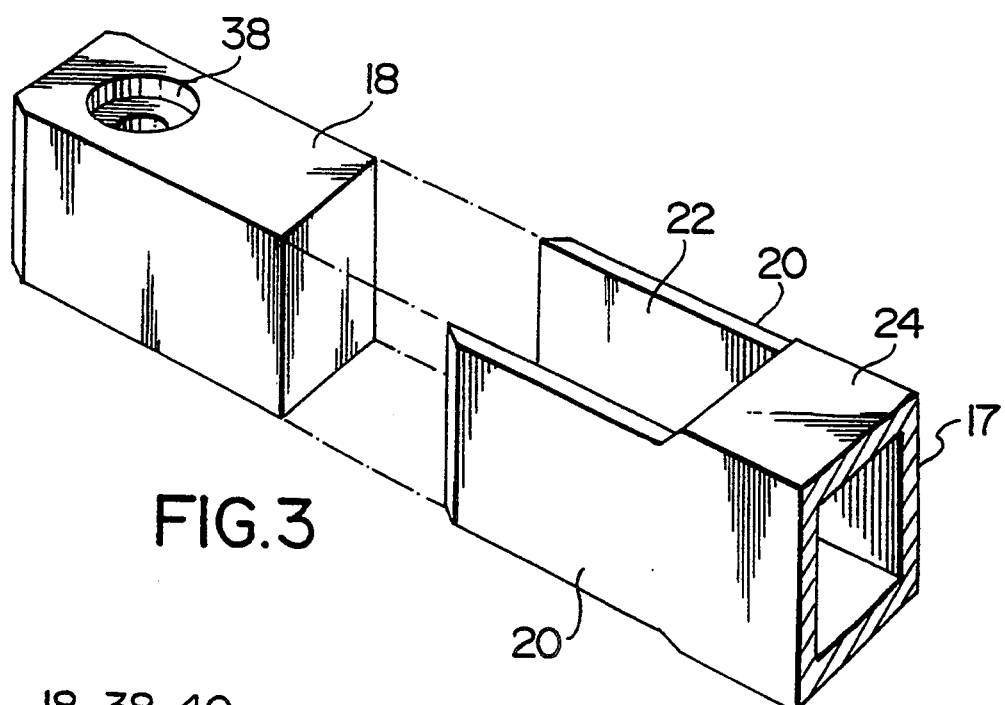
FIG. 3 is a view similar to FIG. 2 of part of the corner shown exploded.
Figure 4:
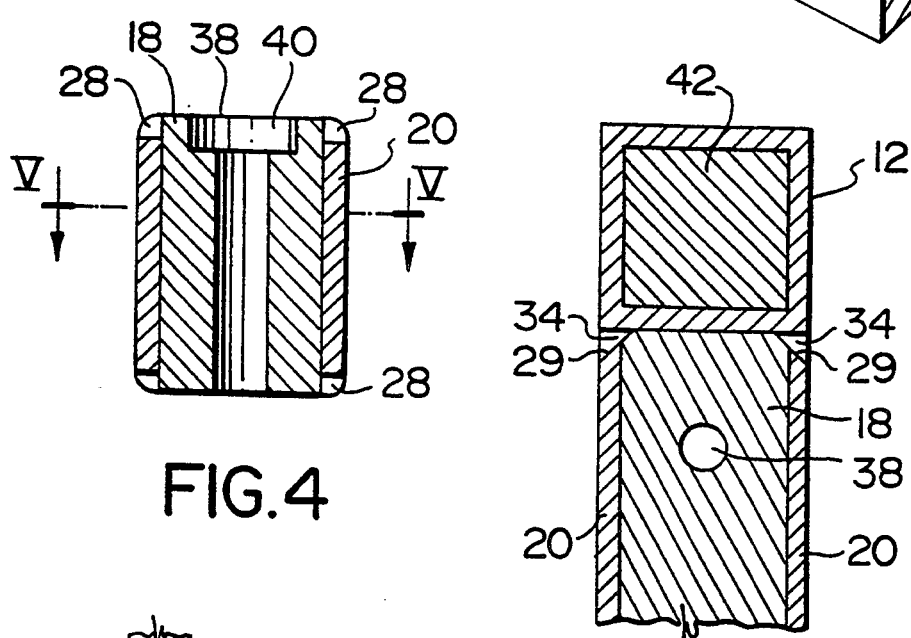
FIG. 4 is a cross-sectional view through the corner of the support frame of the first embodiment taken along line IV—IV in FIG. 2.
Figure 5:
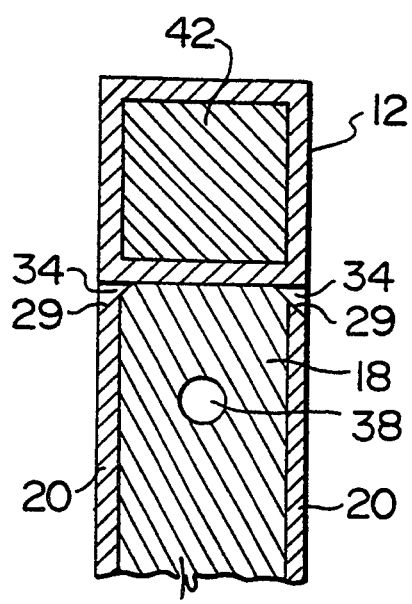
FIG. 5 is a cross-sectional view through the corner of the frame of the first embodiment taken along line V—V in FIG. 4.
Figure 6:
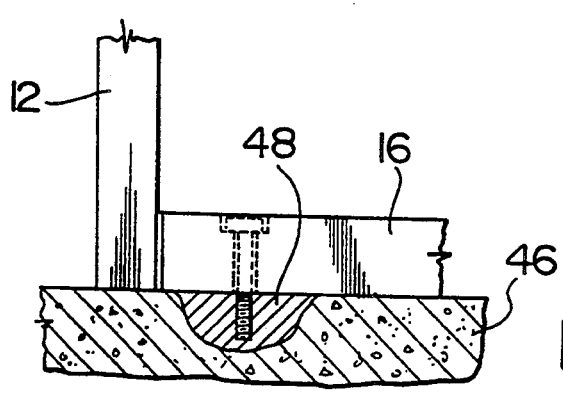
Figure 7:
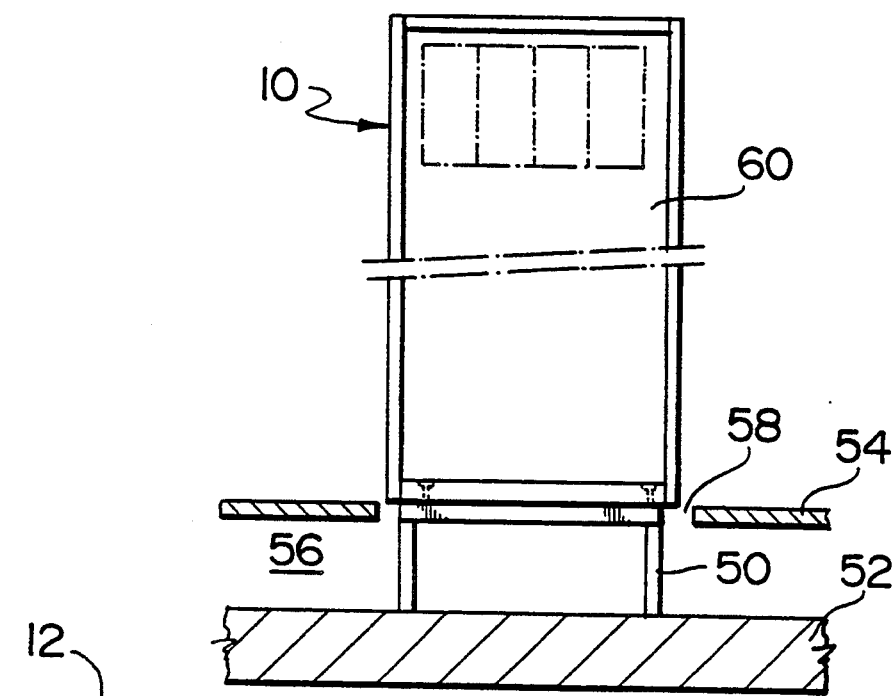
Figure 8:
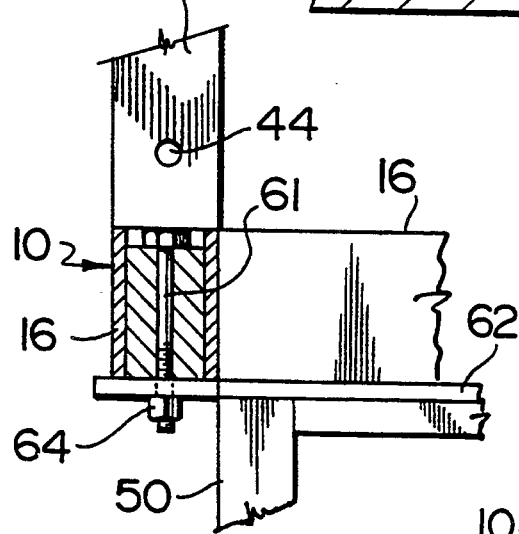
Figure 9:
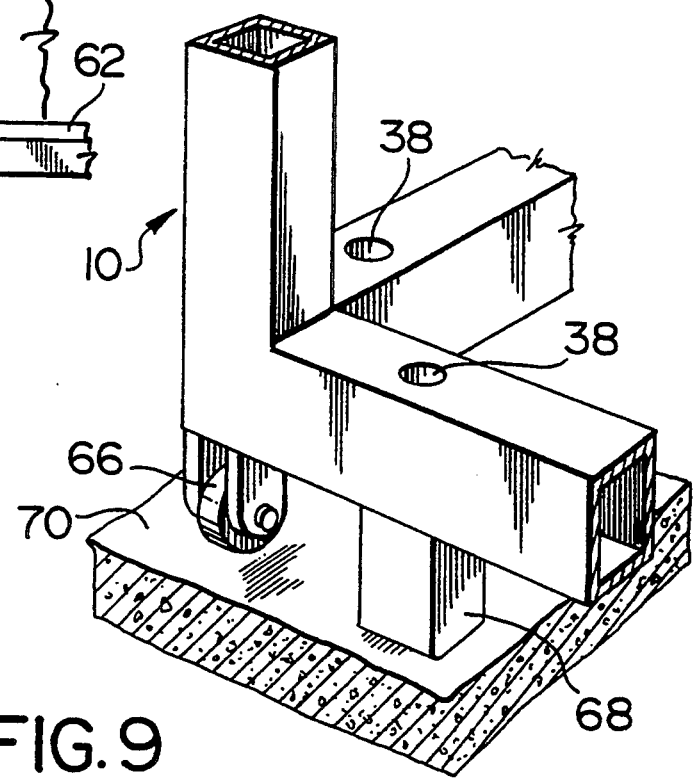

FIG. 6, on smaller scale than FIGS. 2 to 5, is a front elevational view of the bottom corner of the frame of the first embodiment and showing the frame assembled to a concrete foundation;

FIG. 7, also on smaller scale, is a front elevational view of the frame of the first embodiment when holding telecommunications equipment and mounted in position upon a pedestal on an upper floor of a building;

FIG. 8 is a cross-sectional view through a lower corner of the frame of the first embodiment assembled onto the pedestal to show the method of assembly;

FIG. 9 is a smaller isometric view of a lower corner of a modification to the frame of the first embodiment and showing a different mounting arrangement;

FIGS. 10 and 11 are views respectively similar to FIGS. 3 and 5 of a second embodiment; and FIGS. 12 and 13 are views similar to FIG. 2 of second and third embodiments.

Figure 1:
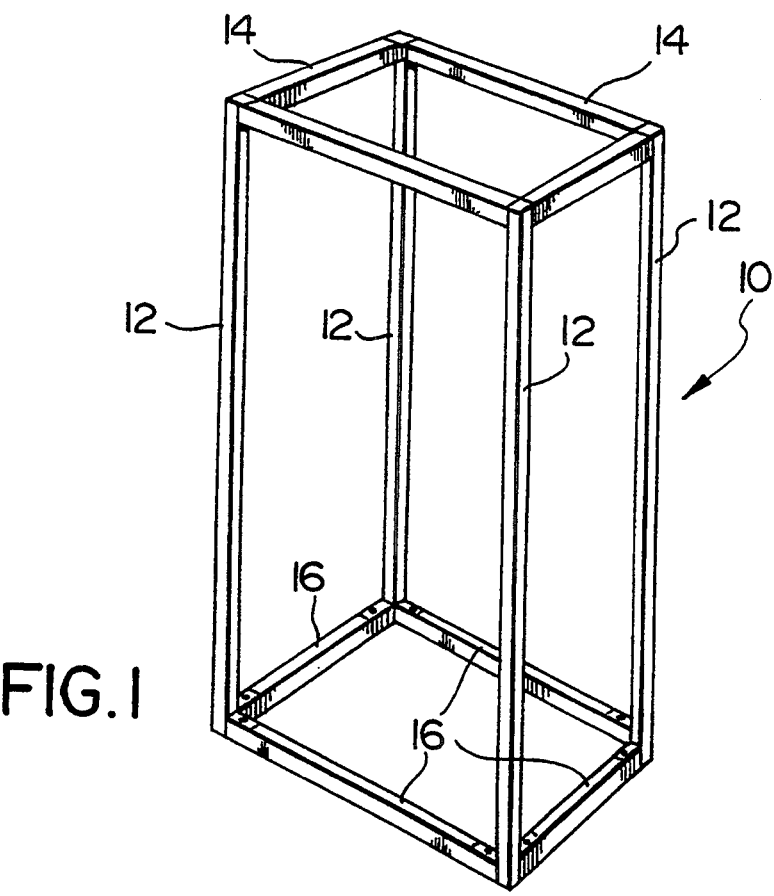
FIG. 1 is an isometric view of an earthquake resistant support frame according to a first embodiment.

As shown in FIG. 1, an earthquake resistant support frame 10 for holding telecommunications equipment comprises four vertically extending frame members 12 which are spaced apart at the four corners of a rectangle in plan view, the four members 12 being secured at their upper ends by rigid horizontal members 14 extending along edges of the rectangle. All of the frame members 12 and 14 and other parts of the frame to be described are made from carbon steel tubing of rectangular or square cross-section shown clearly in FIGS. 2 and 5. The upwardly extending frame members 12 are 1.5 inches square with a thickness of 0.12 inches and a height of approximately 76 inches.

At their lower ends, the upwardly extending frame members 12 are secured in relatively fixed positions at the corners of the rectangle by a frame base means. The base means comprises four base frame members 16 each of which in turn comprises an elongate intermediate element 17 (FIG. 2) extending along a side of the rectangle between successive frame members 12, the elements 17 being rectangular box sections with a greater height than width for maximum strength and to advantageously increase the natural frequency of the structure. In this embodiment to achieve these requirements, each element 17 has a height of 2 inches and a width of 1.5 inches. The elements 17 extend to the associated upwardly extending frame members 12 and end regions of the base frame members 16 are more massive to increase the rigidity and stiffness of the total structure. As is shown by FIGS. 2, 3, 4 and 5, at the more massive end regions of the base means are provided end members 18 which are of block structure carbon steel material of rectangular cross-section so as to fit snugly between vertical opposing sides 20 of the respective elements 17. The upper and lower sides 24 at the end regions of each of the elements 17 are removed, as shown particularly in FIG. 3, to provide a slot 22 into which an end member 18 is snugly received in contact with the inside faces of the sides 20 of the elongate elements 17.

The end members 18 have a depth sufficient to extend outwardly in both vertical directions to lie coplanar with the outside surfaces of the upper and lower sides 24 of the elements 17. The end members are welded into position into the slots 22 by weld fillets 28 between the sides 20 and the end members and weld fillets 30 between the inner ends of the end members and the ends of the sides 24 forming the bases of the slots. The end members 18 and the elongate intermediate elements 17 are thus rigidly secured together. The end members 18 and the elements 17 are also rigidly secured to the vertically extending frame members 12 also by welding. As is particularly shown in FIGS. 2 and 5, the ends of the sides 20 are chamfered at position 29, this chamfer extending into the ends of the end members 18. A weld fillet 34 is provided between the vertically extending frame members 12 on the one hand and the sides 20 and the end members 18 on the other hand, this fillet being provided in the space formed by the chamfer 29. As may be seen, this results in each end member 18 being welded to its respective vertically extending frame member 12 in addition to the sides 20 of the elongate elements 17 being secured to the frame member 12. A weld line is also provided at position 36 along the top and bottom outer end of each end member 18 to rigidly secure it to its respective vertically extending member 12.

Each of the end members 18 is formed with a vertically extending through aperture 38 for receiving screw threaded means to mount the frame 10 upon a support. As shown in FIG. 4, each of these apertures 38 has an upper end 40 of larger diameter than the remainder for containing the head of a securing bolt to be passed through the aperture. As may be seen from the above description, when a bolt is positioned through each of the apertures 38 for holding a frame in position on a supports the support load is taken both through the associated end member 18 and the sides 20 of the elongate element 17 into the adjacent vertically extending frame member 12. Because of the rigid connection between the end members 18 and the elongate elements 17 with the vertically extending frame members 12, the rigidity of the frame is maximized with negligible or no bending being permitted between each aperture and the adjacent vertically extending member. The stiffness of the frame when mounted upon a support is partly dependent upon the distance between each of the apertures and the adjacent frame member 12, in that as the distance between the aperture and the adjacent frame member decreases then the stiffness of the frame increases. It has been found that with the construction described in this embodiment, with a distance of 1.5 inches approximately between the center of each aperture 38 and the adjacent side of the associated vertically extending member 12 then the frame 10, secured to a concrete foundation on the ground, has a natural vibrational frequency of 13 to 14 Hz when subjected to an earthquake of intensity 8.3 on the Richter scale. The structure described in this embodiment to provide this high frequency has a weight of approximately 128 lbs which is extremely low compared to conventional structures.

To assist in the stiffness when two or more of the frames 10 are being assembled side-by-side, each of the vertically extending frame members 12 is provided at its lower end with a block carbon steel insert 42 (FIG. 2) which extends to the lower end of the frame and is welded in position. Two horizontally extending apertures 44 are formed through each of the vertically extending frame members 12 so as to pass through the insert 42, one aperture 44 towards the lower end of each member 12 (FIG. 2), and one towards the top (not shown). These apertures are aligned with each other from frame-to-frame when the frames are assembled side-by-side for passing securing bolts through them so as to secure the adjacent frames together and increase the total stiffness.

The frame described in this embodiment performs satisfactorily when mounted in different locations to protect telecommunications equipment contained therein from earthquake activity of high intensity, such as 8.3 as measured upon the Richter scale.

For instance, as shown by FIG. 6, as referred to above the frame 10 may be mounted upon a concrete ground foundation 46 by suitable securing bolts 48 of known construction such as "Hilite" bolts manufactured for earthquake securement purposes. As shown in FIG. 6 these bolts are passed through the apertures 38 and into the concrete, securement of the bolt into the concrete being performed in known manner. Such an arrangement provides a natural vibrational frequency of the frame when holding telecommunications equipment of between 13 and 14 Hz for an earthquake intensity of approximately 8.3 on the Richter scale.

In another arrangement, as shown in FIG. 7, the frame 10 of the embodiment is particularly useful when mounted upon a pedestal 50 which is supported upon a structural floor 52 of a building, the floor 52 being above the ground floor. With this, a false floor 54 is disposed above the floor 52, the false floor being provided for holding the weight of operators and maintenance personnel and for forming a space 56 beneath the false floor for the passage of air conditioning cooling air and electrical cables. The pedestal 50 is of known construction and is adjustable in height, e.g. between 21 and 27 inches in height and has a natural vibrational frequency of 70 to 80 Hz when subjected to earthquake intensity of 8.3 on the Richter scale. This pedestal is disposed upon the upper surface of the structural floor 52 and extends upwardly into an aperture 58 formed in the false floor 54 so as to hold the frame 10 and contained electronic equipment 60 above the aperture 58 so that lower regions of the equipment are complete accessible by personnel standing upon the false floor 54. It has been found with this arrangement and with an earthquake of the intensity as already stated, then the natural vibrational frequency of the assembly of the frame 10 and the pedestal 50 is in excess of 8.2 Hz which is completely acceptable for satisfactorily protecting the equipment 60 contained therein.

The frame 10 may be easily secured to the pedestal 50 for instance as shown by FIG. 8 by the use of a solid metal plate 62 which is bolted onto the upper surface of the pedestal 50. This plate extends outwardly slightly beyond the edges of the pedestal 50 whereby the base frame members 16 may be disposed upon the plate 62 and slightly outwardly from the frame of the pedestal. This enables the bolts 61 to be positioned through the end members 18 to be secured in position beneath the plate 62 by nuts 64 as shown in FIG. 8. As described above, it may be seen that the frame 10 of the embodiment has a minimal weight while providing extraordinary stiffness to enable high natural vibrational frequencies of the frame even when mounted upon a pedestal on an upper storey floor. In addition to this, with the base frame members 16 extending around the edges of the lower end of the frame, then the apertures are located towards outer boundaries of the frame so that they are accessible for mounting and demounting of the frame upon a support while the equipment 60 is disposed in position within the frame. This enables the equipment and the frame to be assembled together before the frame is disposed in its operating position. It may be extremely convenient to assemble the equipment to the frame prior to location of the frame in its operational position.

In addition, as shown in FIG. 9, frame 10 may be modified by the addition of supporting wheels 66 which may be disposed at the corners. These wheels are of use particularly when the frame is loaded with telecommunications equipment before being moved into the operating position. Clearly, it is not desirable for the weight of the frame and equipment to be maintained upon the wheels during use. However, it is not necessary to remove the wheels with the frame in the operational position. Instead, the frame and equipment may be raised by the use of suitable jacks for the insertion of rigid metal blocks 68 beneath the end members 18 as shown in FIG. 9, suitable bolts (not shown) then being passed through the apertures 38 and through aligned apertures (not shown) in the blocks 68 before being received within securement holes (not shown) in the lower concrete floor 70. With the use of the blocks 68, the natural vibrational frequency of the combination of the blocks and the frame containing equipment is still maintained at a satisfactory high level.

In a second embodiment (FIGS. 10 and 11), an earthquake resistant support frame 80 is slightly different from that of the first embodiment and in assembled condition is very similar in appearance to the detail shown in FIG. 2. In the second embodiment, parts similar to those in the first embodiment carry the same reference numerals.

The support frame 80 differs from the support frame 10 in that each vertically extending frame member 12 is formed at its lower end with a slot 82 formed by removal of two opposite sides of the member 12 for a distance up the frame member sufficient to accommodate an end member 84. Each end member 84 is similar to, but longer than, an end member 18, the length of each end member 84 being such as to extend completely through its associated slot 82. In the frame 80, weld fillets are provided similar to those of FIG. 2. In addition, weld fillets 86 are provided between the end 87 of each end member 84 and sides 88 of the respective member 12 which define the slot 82 (FIG. 11). Also, a weld fillet (not shown) connects the end of each end member 84 across the top end of the slot 82 to join the two weld fillets 86.

It is not essential for the frame members to have a cross-sectional shape as described in the embodiment. In any particular structure, the frame member design is dependent upon the particular loading requirement.

For instance, as shown by FIG. 12, in a second embodiment which is otherwise similar to the first embodiment, base frame members 100 have elongate intermediate elements 102 of circular tubular section. At end regions of each element 102, upper and lower arcuate regions of the tubular section are removed to provide through slots into which are received end members 104 of complementary shape to the elongate elements 102. The end members 104 are welded into position along all accessible edges and surfaces which oppose the element 102. For stability and load transmission, the lower surface of each end member 104 is horizontally planar and may have shoulders 106 which abut upwardly against downwardly facing edges 108 of the slot at lower regions of the tubular section. A bolt receiving aperture 110 is provided in each end member 104.

In a further embodiment (FIG. 13), each base frame member 110 has an elongate intermediate member 112 an L-shaped section. At each end of each member 112 there is provided a more massive structure formed by a square section carbon steel block 114 welded into position within the L-shaped section against each flange of the section. The steel block and the member 112 at each end of each base frame member 110 is welded directly to a vertically extending frame member (not shown).

What is claimed is:

1. An earthquake resistant electronic equipment support frame comprising a plurality of upwardly extending frame members and frame base means extending between the upwardly extending frame members to hold the upwardly extending frame members in fixed relative positions, the frame base means having proximate regions extending directly from the upwardly extending frame members, said proximate regions being of more massive construction than parts of the frame base means which are remote from the upwardly extending frame members, the proximate regions being rigidly secured to the upwardly extending frame members and formed with apertures for receiving screw-threaded members to mount the frame upon a support;

wherein lower ends of the upwardly extending frame members are disposed at locations forming corners of a polygon and at least some of the proximate regions of the frame base means lie along sides of the polygon;

wherein the frame base means comprises a plurality of base frame members comprising elongate intermediate elements extending along sides of the polygon and having end regions, the proximate regions of the frame base means being provided at opposite end regions proximate of each of the intermediate elements, the proximate regions comprising end members of the base frame members, the end members being separated by the intermediate elements and extending along and rigidly secured to the end regions of the intermediate elements; and wherein each intermediate element is of box cross-section and the end members are of solid block structure and are disposed within channels at the end regions of the intermediate elements.

2. An earthquake resistant electronic equipment support frame forming an open-sided box comprising a plurality of upwardly extending metal frame members, metal frame base members and laterally extending metal upper frame members spaced above the base members, the base members and the upper frame members rigidly secured to the upwardly extending frame members to hold the upwardly extending frame members in fixed relative positions, each frame base member comprising an elongate intermediate element of box cross-section extending between two upwardly extending frame members and having two end regions, and two end members of solid block structure disposed one within each end region of the intermediate element and secured rigidly to the intermediate element, and wherein each end member is formed with a downwardly extending through aperture for receiving screw threaded members to mount the frame upon a support.

3. A frame according to claim 2, wherein each intermediate element is of rectangular box-section and has two pairs of opposite walls and along each end region, each intermediate element has one of the two pairs of opposite walls removed to form a slot and an end member is received within the slot so as to lie between and be rigidly secured to the other of the two pairs of opposite walls.

4. A frame according to claim 3, wherein each end member is rigidly secured between the other of the two pairs of walls by welding and each end member and ends of the other of the two pairs of walls forming the slot and containing the end member are all rigidly secured to an associated upwardly extending frame member by welding.

5. A frame according to claim 2, wherein the upwardly extending frame members are of box-section to form channels and have lower ends, and vertical end members of solid block structure are included within and are rigidly secured within the lower ends of the upwardly extending frame members.

6. A frame according to claim 2, Wherein the upwardly extending frame members, the frame base members, and the laterally extending upper frame members are all formed from carbon steel.

* * * * *